US011327807B2

(12) United States Patent
Clark (10) Patent No.: US 11,327,807 B2
(45) Date of Patent: May 10, 2022

(54) PLATFORM FOR COLLABORATIVE PROCESSING OF COMPUTING TASKS

(71) Applicant: Balanced Media Technology, LLC, McKinney, TX (US)

(72) Inventor: Corey Clark, Plano, TX (US)

(73) Assignee: Balanced Media Technology, LLC, McKinney, TX (US)

(*) Notice: Subject to any disclaimer, the term of this patent is extended or adjusted under 35 U.S.C. 154(b) by 172 days.

(21) Appl. No.: 16/000,589

(22) Filed: Jun. 5, 2018

(65) Prior Publication Data

US 2018/0349201 A1    Dec. 6, 2018

Related U.S. Application Data

(60) Provisional application No. 62/515,398, filed on Jun. 5, 2017.

(51) Int. Cl.
*G06F 9/46* (2006.01)
*G06F 9/50* (2006.01)
(Continued)

(52) U.S. Cl.
CPC .......... *G06F 9/5072* (2013.01); *G06F 3/0481* (2013.01); *G06F 9/451* (2018.02);
(Continued)

(58) Field of Classification Search
CPC ...... G06F 9/5072; G06F 9/451; G06F 3/0481; G06N 20/00; G06N 3/08; H04L 9/06; H04L 9/3239
See application file for complete search history.

(56) References Cited

U.S. PATENT DOCUMENTS 9,800,517 B1 * 10/2017 Anderson ............... H04L 47/70
9,898,628 B1 *  2/2018 Catalano ................. G06K 1/128
(Continued)

FOREIGN PATENT DOCUMENTS

WO     2017019530 A1     2/2017
WO     2017089443 A1     6/2017

OTHER PUBLICATIONS

Charles A. Cusack, Chris Martens, Priyanshu Mutreja, "Volunteer computing using casual games", Jan. 2006, Hope College (Year: 2006).*

(Continued)

*Primary Examiner* — Tammy E Lee (57) ABSTRACT

Methods, systems, and media for a platform for collaborative processing of computing tasks. The method includes sending, to client devices, a one or more client applications including program code associated with an interactive application and a machine learning application. When executed, the program code causes the client devices to generate a user interface for the interactive application; request, using the generated user interface, inputs from a user of the client devices; receive the requested inputs; process, using computing resources of the client devices, at least part of the machine learning application; and transmit data associated with results of the received inputs and the processing of at least part of the machine learning application. The method further includes receiving and processing the data associated with the results of the received inputs and the processing of at least part of the machine learning application to process the computing tasks.

17 Claims, 3 Drawing Sheets

(51) Int. Cl.
*G06F 3/0481* (2022.01)
*H04L 9/06* (2006.01)
*G06F 9/451* (2018.01)
*G06N 20/00* (2019.01)
*H04L 9/32* (2006.01)
*G06N 3/08* (2006.01)

(52) U.S. Cl.
CPC .............. *G06N 3/08* (2013.01); *G06N 20/00* (2019.01); *H04L 9/06* (2013.01); *H04L 9/3239* (2013.01); *H04L 2209/38* (2013.01); *H04L 2209/60* (2013.01)

(56) References Cited

U.S. PATENT DOCUMENTS

| | | | |
|---|---|---|---|
| 10,272,341 B1* | 4/2019 | Blackwell | A63F 13/46 |
| 10,846,749 B1* | 11/2020 | Gratz | G06Q 30/0267 |
| 2006/0195508 A1 | 8/2006 | Bernardin et al. | |
| 2008/0154917 A1 | 6/2008 | Gounares et al. | |
| 2011/0314537 A1* | 12/2011 | Hulten | G06F 21/577 726/17 |
| 2013/0229333 A1 | 9/2013 | Schwartz et al. | |
| 2015/0199874 A1* | 7/2015 | Arnone | G07F 17/3267 463/25 |
| 2016/0065524 A1* | 3/2016 | Umapathy | H04L 51/14 709/206 |
| 2018/0293240 A1* | 10/2018 | Golland | G06F 16/24578 |
| 2018/0335308 A1* | 11/2018 | Zavesky | G01C 21/3484 |
| 2018/0336226 A1* | 11/2018 | Anorga | G06N 20/00 |
| 2018/0349783 A1 | 12/2018 | Pouyllau | |

OTHER PUBLICATIONS

International Search Report and Written Opinion regarding Application No. PCT/US2018/036123, dated Aug. 13, 2018, 9 pages.
Tuovinen, "From Machine Learning to Learning with Machines, Remodeling the Knowledge Discovery Process", Doctoral Training Committee of Technology and Natural Sciences of the University of Oulu, Aug. 2014, 100 pages.
Allen, "Do-it-yourself climate prediction", Nature, vol. 401, Oct. 1999, p. 642.
Anderson, "BOINC: A System for Public-Resource Computing and Storage", Proceedings of the 5th IEEE/ACM International Workshop on Grid Computing (Grid '04), Nov. 2004, pp. 4-10.
Anderson et al., "SETI@home: An Experiment in Public-Resource Computing", Communications of the ACM, vol. 45, No. 11, Nov. 2002, pp. 56-61.
Boyle et al., "Engagement in digital entertainment games: A systematic review", Computers in Human Behavior, vol. 28, No. 3, May 2012, pp. 771-780.
Eiben et al., "Increased Diels-Alderase activity through backbone remodeling guided by Foldit players", Nature Biotechnology, vol. 30, No. 2, Feb. 2012, pp. 190-192.
Hand, People power: Networks of human minds are taking citizen science to a new level, Nature, vol. 466, Aug. 2010, pp. 685-687.
Heien et al., "Computing Low Latency Batches with Unreliable Workers in Volunteer Computing Environments", Journal of Grid Computing, vol. 7, Dec. 2009, pp. 501-518.
"Want to Help Cure Disease or Discover New Stars? Now You Can, Using Your Smartphone", IBM, Jul. 2016, 3 pages.
Jones, "Computer sharing loses momentum", Nature, vol. 506, Feb. 2014, 3 pages.
Kesten, "Week in video-game news: 'God of War II' storms the PS2; a PS3 research project", Pittsburgh Post-Gazette, Mar. 2007, 3 pages.
Kondo et al., "Cost-Benefit Analysis of Cloud Computing versus Desktop Grids", 2009 IEEE International Symposium on Parallel & Distributed Processing (IPDPS), May 2009, 12 pages.
Luban, "The Design of Free-To-Play Games: Part 1", Nov. 2011, 8 pages.
Medler, "Player Dossiers: Analyzing Gameplay Data as a Reward", International Journal of Computer Game Research, vol. 11, No. 1, Feb. 2011, 18 pages.
Nunneley, "Blizzard had biggest quarterly online player community in history thanks to Overwatch and World of Warcraft", Nov. 2016, 3 pages.
Pande, "Life with Playstation—a new update to the FAH/PS3 client", Folding@home, Sep. 2008, 2 pages.
Pande et al., "Atomistic Protein Folding Simulations on the Submillisecond Time Scale Using Worldwide Distributed Computing", Biopolymers, vol. 68, No. 1, Jan. 2003, pp. 91-109.
Peplow, "Citizen science lures gamers into Sweden's Human Protein Atlas", Nature Biotechnology, vol. 34, No. 5, May 2016, pp. 452-453.
Reisinger, "Sony folds up Folding@home PS3 project after 100M hours", CNET, Oct. 2012, 2 pages.
Repetto, "Hybrid Architecture for Constructive Interactive Simulation: Evaluation and Outcomes", Interservice/Industry Training, Simulation, and Education Conference (I/ITSEC), Nov. 2010, 11 pages.
Shih, "US supercomputer needs more people power", Feb. 2017, 2 pages.
"Increase in 'active' PS3 folders pushes Folding@Home past 4 Petaflops!", Sep. 2008, 1 page.
Toth, "Volunteer Computing With Video Game Consoles", Proceedings of the 6th WSEAS Int. Conf. on Software Engineering, Parallel and Distributed Systems, Feb. 2007, pp. 102-106.
"The projects", Cancer Research UK, copyright 2017, 3 pages.
Von Ahn et al., "Peekaboom: A Game for Locating Objects in Images", Proceedings of the SIGCHI Conference on Human Factors in Computing Systems (CHI '06), Apr. 2006, pp. 55-64.
Williams, "PlayStation's serious side: Fighting Disease", CNN, Oct. 2006, 2 pages.
"Human-in-the-Loop", Figure Eight Inc., copyright 2018, 3 pages.
Markoff, "In a Video Game, Tackling the Complexities of Protein Folding", The New York Times, Aug. 2010, 3 pages.
Peel, "Citizen Scientists can spot cancer cells like pathologists, so what happens next?", Cancer Research UK, Oct. 2015, 3 pages.
Extended European Search Report regarding Application No. 18814054.5, dated Feb. 12, 2021, 7 pages.
Zevin, et al., "Gravity Spy: Integrating Advanced LIGO Detector Characterization, Machine Learning, and Citizen Science", Classical and Quantum Gravity, vol. 34, No. 6, Mar. 2017, available online Nov. 2016, 27 pages.
Fabisiak, et al., "Browser-Based Harnessing of Voluntary Computational Power", Foundations of Computing and Decision Sciences, vol. 42, No. 1, Feb. 2017 (Feb. 1, 2017), pp. 3-42.
Matheny, et al., "ExSci TecH: Expanding Volunteer Computing to Explore Science, Technology, and Health", 2012 IEEE 8th International Conference on E-Science Oct. 2012 (Oct. 8, 2012), 8 pages.
European Patent Office, Communication pursuant to Article 94(3) EPC dated Jan. 31, 2022 regarding Application No. 18814054.5, 7 pages.

\* cited by examiner

PLATFORM FOR COLLABORATIVE PROCESSING OF COMPUTING TASKS

CROSS-REFERENCE TO RELATED APPLICATIONS AND CLAIM OF PRIORITY

The present application claims priority to U.S. Provisional Patent Application Ser. No. 62/515,398, filed on Jun. 5, 2017. The content of the above-identified patent documents is incorporated herein by reference.

TECHNICAL FIELD

This disclosure relates generally to volunteer grid computing systems. More specifically, this disclosure relates to a platform for collaborative processing of computing tasks.

BACKGROUND

As the demand for cloud-based computing and data processing of large data sets grows so too does the demand for computer resources. Grid or distributed computing is a solution for generating enormous computing power that can be used to process large datasets. Grid computing or distributed computing is a type of computing that utilizes a collection of computer resources from multiple locations (i.e., different, remotely-located computing devices) to perform related tasks. Volunteer computing is a type of grid computing in which computer owners or users donate their computing resources to one or more projects. Many volunteer computing systems use a pull-based system where a client program on the volunteer's computer requests and process tasks while the computer would otherwise be idle.

Volunteer computing is an effective tool to use microservices or to solve parallel problems where the project is divided into small chunks, called work units, to distribute to machines running a volunteer client. Because multiple clients are used for data processing, the data and algorithms typically need to be easily parallelizable to get the most value from the process. Volunteer computing systems resources can significantly reduce the cost of data processing compared to purchasing and maintaining on-site dedicated resources or procuring a cloud-based data-processing service.

SUMMARY

Embodiments of the present disclosure provide a platform for collaborative processing of computing tasks.

In one embodiment, a method for processing computing tasks is provided. The method includes sending, to a plurality of client devices, one or more client applications including program code associated with an interactive application and a machine learning application. The program code, when executed by a processor of one or more of the plurality of client devices, causes the one or more client devices to generate a user interface for the interactive application; request, using the generated user interface for the interactive application, inputs from a user of the one or more client devices; receive the requested inputs; process, using computing resources of the one or more client devices, at least part of the machine learning application; and transmit data associated with results of the received inputs and the processing of at least part of the machine learning application. The method further includes receiving and processing the data associated with the results of the received inputs and the processing of at least part of the machine learning application to process the computing tasks.

In another embodiment, a system for processing computing tasks is provided. The system includes a communication interface and a processor operably connected to the communication interface. The communication interface is configured to send, to a plurality of client devices, one or more client applications including program code associated with an interactive application and a machine learning application. The program code, when executed by a processor of one or more of the plurality of client devices, causes the one or more client devices to generate a user interface for the interactive application; request, using the generated user interface for the interactive application, inputs from a user of the one or more client devices; receive the requested inputs; process, using computing resources of the one or more client devices, at least part of the machine learning application; and transmit data associated with results of the received inputs and the processing of at least part of the machine learning application. The communication interface is further configured to receive the data associated with the results of the received inputs and the processing of at least part of the machine learning application. The processor is configured to process the data associated with the results of the received inputs and the processing of at least part of the machine learning application to process the computing tasks.

In another embodiment, a non-transitory, computer-readable medium is provided. The non-transitory, computer-readable medium includes program code associated with an interactive application and a machine learning application. The program code, when executed by a processor of an electronic device, causes the electronic device to generate a user interface for the interactive application; request, using the generated user interface for the interactive application, inputs from a user of the electronic device; receive the requested inputs; process, using computing resources of the electronic device, at least part of the machine learning application; and transmit data associated with results of the received inputs and the processing of at least part of the machine learning application.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that, despite their proven value, volunteer computing grids have technical problems including unreliability and because of reliance on their user base remaining active. Embodiments of the present disclosure recognize that a primary challenge for volunteer computing grids is how to incentivize users to share their processing power. Embodiments of the present disclosure provide interactive applications, such as video games, to engage with large audiences for both their computing devices and problem-solving skills towards large-scale scientific or computing problems.

Embodiments of the present disclosure further recognize the technical problem that computing resource donation by devices in volunteer computing grid is not utilizing the full potential of computing task processing of which the volunteer computing grid is capable. Embodiments of the present disclosure provide and utilize interactive applications to generate data for machine learning applications. These interactive applications incentive user or community for input or interaction through feedback, rewards, access, media content or entertainment either directly for user or indirectly for an individual or organization in the community or the community as a whole. For example, these interactive applications may include video games, media applications, or any other application that incentivizes or utilizes user input or interaction. As used herein, machine learning is the use of statistical techniques to build a model using inputs to iteratively and progressively improve the processing of a task. As used herein, example machine learning applications include, without limitation, data science, analytics, artificial intelligence (AI), and data mining applications. For example, video games are applied to generate training data for machine learning algorithms, such as deep neural networks; evaluate decisions, such as supervised learning; provide mutation on solutions; and/or other additional heuristic processes provided or aided by human intuition. Embodiments of the present disclosure also utilize video games may provide an opportunity for volunteer computing by utilizing computing resources (e.g., processing power, storage capability, and network connections) while the user is playing the video game or during idle time. For example, computing resources can be utilized with an application running in the background to give users updates, stay connected to community, etc. and all the while utilizing idle computing resources. Volunteer computing provides large processing and algorithm speeds increases due to the massive amount of computing power available via the number of gaming devices joined in the distributed computing environment.

Accordingly, embodiments of the present disclosure provide technical solutions via a platform for collaborative processing of computing tasks. Various embodiments provide a crowd computing platform that combines human perception and unstructured problem-solving skills with raw computing power by utilizing volunteer grid computing integrated into an engaging entertainment for machine learning applications. Any Wi-Fi enabled device running a web browser, game, or application can be part of the distributed computing environment. Embodiments of the present disclosure also provide a generalized interface for programmers, researchers, and developers to utilize connected devices to help sort, validate, search, and process data.

Utilizing interactive entertainment, such as video games, embodiments of the present disclosure can also keep people engaged and online, which provides more time to utilize computing resources—taking advantage of both idle and active computing time. Interactive entertainment involves a person being actively engaged with the content. As a result, embodiments of the present disclosure provide opportunities to utilize crowd-sourcing techniques to improve machine learning. Embodiments of the present disclosure enable a new type of cloud network, one in which machines and humans interact to find solutions faster, without the infrastructure or expense traditionally associated with cloud computing. Embodiments of the present disclosure also provide for motivating and empowering massive online communities, such as gaming communities, to use the hours they already spend consuming entertainment towards helping process critical problems that help create a better world.

Figure 1:
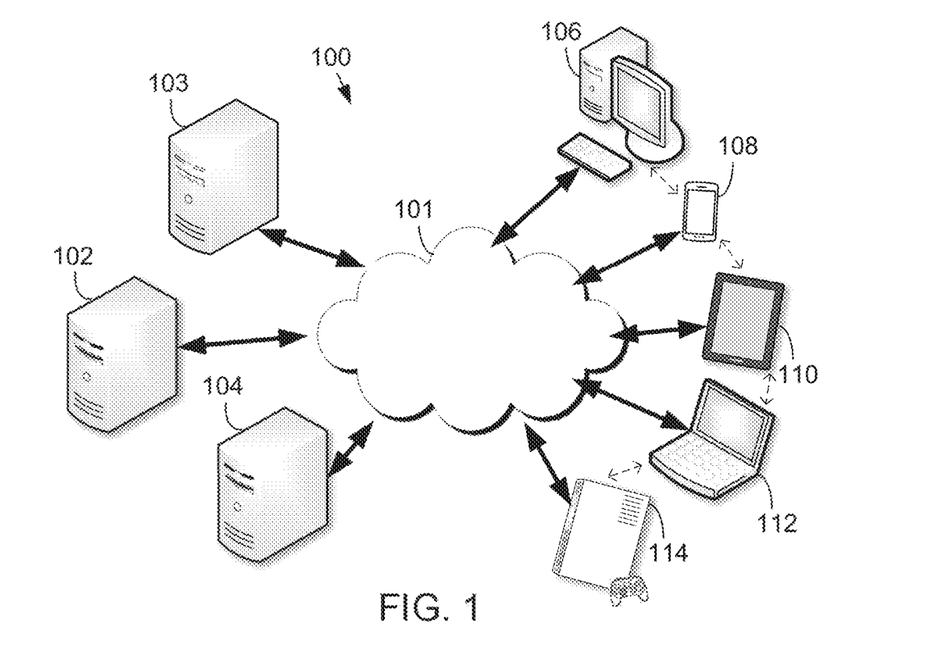
FIG. 1 illustrates an example networked system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 101, which facilitates communication between various components in the system 100. For example, the network 101 may communicate Internet Protocol (IP) packets or other information between network addresses. The network 101 may include one or more local area networks (LANs); metropolitan area networks (MANs); wide area networks (WANs); a virtual private network (VPN); all or a portion of a global network, such as the Internet; or any other communication system or systems at one or more locations.

The network 101 facilitates communications among various servers 102-104 and various client devices 106-114. Each of the servers 102-104 may be any suitable electronic computing or processing device(s) that can provide computing services including software for one or more client devices 106-114. Each of the servers 102-104 could, for example, include one or more processing devices, one or more memories storing instructions and data, and one or more network interfaces facilitating communication over the network 101. For example, as discussed in greater detail below, server 102 may provide or manage a platform for collaborative computing, research, or development using grid computing by coordinating volunteer grid computing using the client devices 106-114. Server 103 may be a server assorted with software or gaming development that, as discussed in greater detail below, utilizes crowdsourcing techniques to improve machine learning algorithms. Server 104 may be a server associated with a researcher, developers, or other grid computing consumer that has projects or tasks that need to be processed using the platform.

Each client device 106-114 represents any suitable electronic computing or processing device that interacts with at least one server or other computing device(s) over the network 101. In this example, the client devices 106-114 include a desktop computer 106, a mobile telephone or smartphone 108, a tablet computer 110, a laptop computer 112, a video game console 114; a set-top box and/or television, etc. However, any other or additional client devices could be used in the networked system 100. For example, any Internet or network connectable device or Internet of Things (IoT) device (e.g., Smart TVs, refrigerators, Raspberry PIs, etc.) could be used for one of the client device 106-114 in system 100. As discussed below, in various embodiments, client devices 106-114 participate, under the coordination of server 102, to form a volunteer computing grid (possibly along with other computing devices) to provide a platform for collaborative processing of computing tasks. For example, as discussed herein, the client devices 106-114 may be considered to be individual cells of the computing grid. Moreover, individual cells can communicate with each other or a server directly or indirectly using, for example, a peer to peer, ad hoc, and/or mesh-based networks with or without a centralized server.

In various embodiments, the servers (e.g., server 102) in connection with the client devices 106-114 form a computing grid for processing of computer tasks. In various embodiments, the server 102 administers custom code for the coordination, provision, and tracking of tasks and cells of the computing grid. In other embodiments, the server 102 administers a virtual private network (VPU) connecting the cells within the computing grid. In these embodiments, commercially available software may be run by the computing grid to perform the computing tasks.

Although FIG. 1 illustrates one example of a networked system 100, various changes may be made to FIG. 1. For example, the system 100 could include any number of each component in any suitable arrangement and each of servers 102-104 and client devices 106-114 may be representative of any number of servers and/or client devices that are part of system 100. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
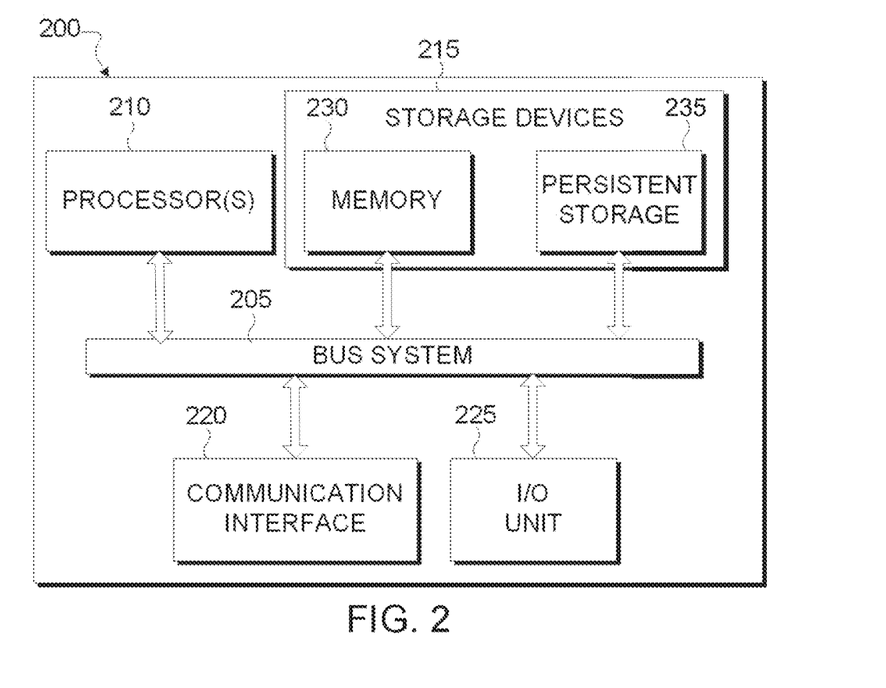
FIG. 2 illustrates an example of a server in which various embodiments of the present disclosure may be implemented.
Figure 3:
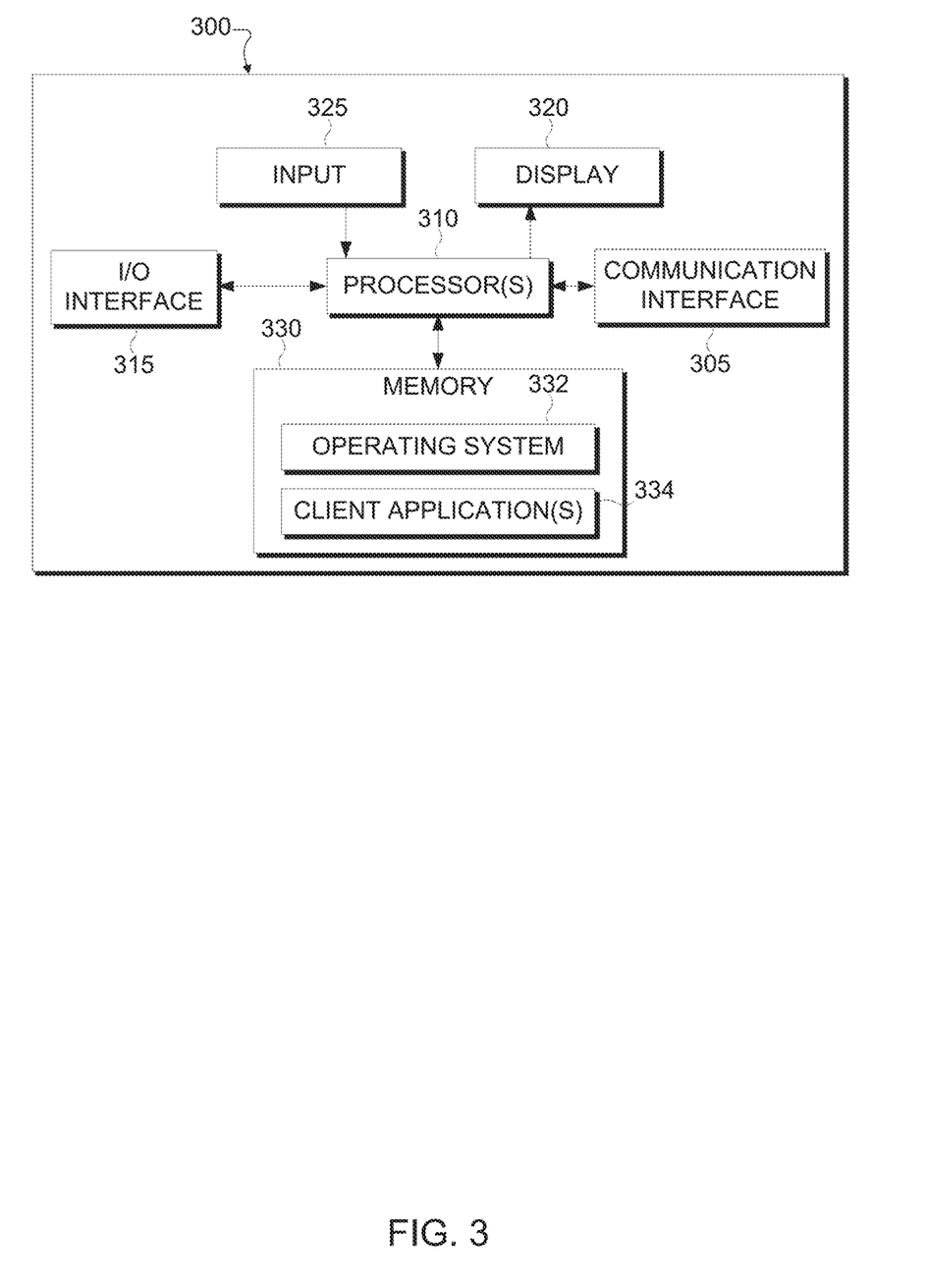
FIG. 3 illustrates an example of a client device in which various embodiments of the present disclosure may be implemented.

FIGS. 2 and 3 illustrate example computing devices in a networked system according to various embodiments of the present disclosure. In particular, FIG. 2 illustrates an example server 200, and FIG. 3 illustrates an example client device 300. In this illustrative example, the server 200 represents any one of the servers 102-104 in FIG. 1, and the client device 300 could represent one or more of the client devices 106-114 in FIG. 1.

As shown in FIG. 2, the server 200 includes a bus system 205, which supports communication between processor(s) 210, storage devices 215, communication interface (or circuit) 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc. For example, persistent storage 235 may store one or more databases of data, client applications for cells in a volunteer computing grid, tasks awaiting dispatch to cells in volunteer computing grid, and/or processing results from a volunteer computing grid, etc.

The communication interface 220 supports communications with other systems or devices. For example, the communication interface 220 could include a network interface card or a wireless transceiver facilitating communications over the network 101. The communication interface 220 may support communications through any suitable physical or wireless communication link(s). The I/O unit 225 allows for input and output of data. For example, the I/O unit 225 may provide a connection for user input through a keyboard, mouse, keypad, touchscreen, or other suitable input devices. The I/O unit 225 may also send output to a display, printer, or other suitable output devices.

Although FIG. 2 illustrates one example of a server 200, various changes may be made to FIG. 2. For example, various components in FIG. 2 could be combined, further subdivided, or omitted and additional components could be added according to particular needs. As a particular example, while depicted as one system, the server 200 may include multiple server systems that may be remotely located. In another example, different server systems may provide some or all of the processing, storage, and/or communication resources for providing a platform for collaborative processing of computing tasks in accordance with various embodiments of the present disclosure. In another example, the server 200 may be part of the volunteer computing grid. For example, one or more computing devices within the volunteer computing grid may include software for individually or jointly performing the actions of the server 200 as discussed herein.

FIG. 3 illustrates an example client device 300 according to embodiments of the present disclosure. The embodiment of the client device 300 illustrated in FIG. 3 is for illustration only, and the client devices 106-114 of FIG. 1 could have the same or similar configuration. However, client devices come in a wide variety of configurations, and FIG. 3 does not limit the scope of this disclosure to any particular implementation of an electronic device. As shown in FIG. 3, the client device 300 includes a communication interface (or circuit) 305, processor(s) 310, an input/output (I/O) interface 315, an input 325, a display 320, and a memory 330. The memory 330 includes an operating system (OS) 332 and one or more client applications 334.

The communication interface or circuit 305 supports communications with other systems or devices. For example, the communication interface 305 could include a network interface card or a wireless transceiver facilitating communications over the network 101. The communication interface 305 may support communications through any suitable physical or wireless communication link(s). For embodiments utilizing wireless communication, the communication interface 305 may receive an incoming RF signal via one or more antennas using a variety of wireless communication protocols, (e.g., Bluetooth, Wi-Fi, cellular, LTE communication protocols etc.).

The processor(s) 310 can include one or more processors or other processing devices and execute the OS 332 stored in the memory 330 in order to control the overall operation of the client device 300. The processor(s) 310 is also capable of executing client application(s) 334 resident in the memory 330, such as, program code for one or more client applications for performing computing tasks, such as, for example, processing or computational tasks, communication or network tasks, and storage tasks as part of a volunteer computing grid. The client application(s) 334 may include program code for machine learning applications or interactive applications, such as video games or applications incentivizing user input, as discussed in greater detail below. The processor(s) 310, communication interface 305 and/or memory 330 constitute the computing resources of the client device 300. The processor(s) 310 may include any suitable number(s) and type(s) of processors or other devices in any suitable arrangement. Example types of processor(s) 310 include microprocessors, microcontrollers, graphical processing units (GPUs), digital signal processors, field programmable gate arrays, application specific integrated circuits, and discrete circuitry.

The processor(s) 310 can move data into or out of the memory 330 as required by an executing process. The processor(s) 310 is also coupled to the I/O interface 315, which provides the client device 300 with the ability to connect to other devices, such as laptop computers and handheld computers. The I/O interface 315 provides a communication path between accessories and the processor(s) 310.

The processor(s) 310 is also coupled to the input 325 and the display 320. The operator of the client device 300 can use the input 325 to enter data and inputs into the client device 300. For example, the input 325 may be a touchscreen, button, keyboard, trackball, mouse, stylus, electronic pen, video game controller, etc. The display 320 may be a liquid crystal display, light emitting diode display, or other display capable of rendering text and/or at least limited graphics, such as from websites. The memory 330 is coupled to the processor(s) 310. Part of the memory 330 could include a random access memory (RAM), and another part of the memory 330 could include a Flash memory or other read-only memory (ROM).

Although FIG. 3 illustrates one example of client device 300, various changes may be made to FIG. 3. For example, various components in FIG. 3 could be combined, further subdivided, or omitted and additional components could be added according to particular needs. As a particular example, the processor(s) 310 could be divided into multiple processors, such as one or more central processing units (CPUs) and one or more graphics processing units (GPUs). In another example, the display 320 may be externally connected to or not a part of the client device 300, such as for example, with a video game console or desktop computer.

Embodiments of the present disclosure provide a platform that connects computing resource consumers, programmers, researchers, and developers to members of a volunteer grid computing network and enable collaboration to perform computing tasks. Embodiments of the present disclosure recognize that participation and frequency thereof is a challenge for a reliable an effective volunteer grid computing network. Accordingly, embodiments of the present disclosure provide incentive and engagement for members of a volunteer grid computing network to improve network size, availability, and reliability. Embodiments of the present disclosure further provide an interface for collaboration through the use of crowd-sourced research or citizen science and the integration of computational resources for processing machine learning application all within a single platform.

In various embodiments, the client devices 300 in connection with the server 200 form a game-based volunteer grid computing system. In one example, the computing system is enabled using a client application, or portion thereof, such as a plugin, which allows developers to easily integrate volunteer computing into an existing game client. On game launch, the manager for the client application (e.g., such as a dynamic link library (DLL) associated with the video game client) launches separate thread(s) on the client device 300 that manages the distributed computing tasks, including gathering work units (WU), processing WU, storage, and sending WU results back to the server 200. The thread on the client device 300 issues pull request(s) to the server 200. The server 200 provides the client device 300 with a chunk of data (e.g., WU) related to the problem(s) being processed via the server 200. The server 200 can also provide the algorithm to be used to analyze the data. After the data and algorithm are downloaded to the client device 300, the thread can run alongside the game and analyze the data.

This separate-thread approach works with many games, particularly less resource-intensive games. However, some games require significant computing resources at the client device 300, which could lead to the volunteer computing thread impacting game performance and user experience. To reduce this issue, the manager for the client application dynamically creates low-priority thread(s) for volunteer computing that run within the client device 300, allowing the game to claim resources when needed, but also taking advantage of times when the game requires lower processing resources (e.g., such as during start screens, while in menus, when the game is paused, while waiting for match-making in-game lobby etc.).

In other examples, the client devices 300 may have a stand-alone launching application that is always running on the client device 300. The launching application and can be used to start up separate client application(s) 334 such as game programs, then the game programs connect to the launching application, and then the launching application connects to the system 100. In other words, the manager for the client application(s) 334 or game that connects the client application(s) to system 100 may not be integrated into the client application(s) 334. For example, the game program may connect to a manager running in another application on the client device 300. Thus, one launching application to exist on a client device 300 but can connect, communicate to, and involve many different applications in system 100 rather than embedding a manager in every application separately.

In addition, in some embodiments, the computing system plugin includes hooks or ties for the game clients to interface with the volunteer computing process. This interfacing allows access to data such as user contributions to the volunteer computing problem and provides the ability for computing resource consumers, developers, or researchers to take advantage of dynamic human computing or citizen science opportunities. As discussed herein, various embodiments provide further improvement to the volunteer computing process by allowing for and/or requesting user feedback relating to the user's contributions, greater gameplay value in the form of credits or dynamically generated content based on results, or other motivation for the player to continue playing and sharing their computing resources and/or citizen science contributions. In one example, this data sharing may allow users to compare their scores to others and visualize the research progress and their relative contributions thereto.

In some embodiments, advantages of running the volunteer computing thread via a DLL associated with the game client are provided because the thread-based approach allows access to video-game-console processing power that would otherwise unavailable. While in other embodiments, a dedicated volunteer computing application running on a client device may provide more computational power per device when run, utilizing the massive number of gamers in the market, providing numerous additional sources of computing power.

In some embodiments, the dedicated volunteer-computing, as well as the video-game-based volunteer-computing systems, may share a common platform whereby rewards for either form of volunteer computing contributions can be utilized for any type of benefit including within the video game. As discussed in greater detail below, the management for the volunteer computing is performed using a central server, such as server 102, which also provides interfaces for developers to integrate into the volunteer computing for supporting elements such as websites and companion applications. Developers can then offer users options to use these supplemental services for more volunteer computing power and/or allow users to interface with the volunteer computing data.

Figure 4:
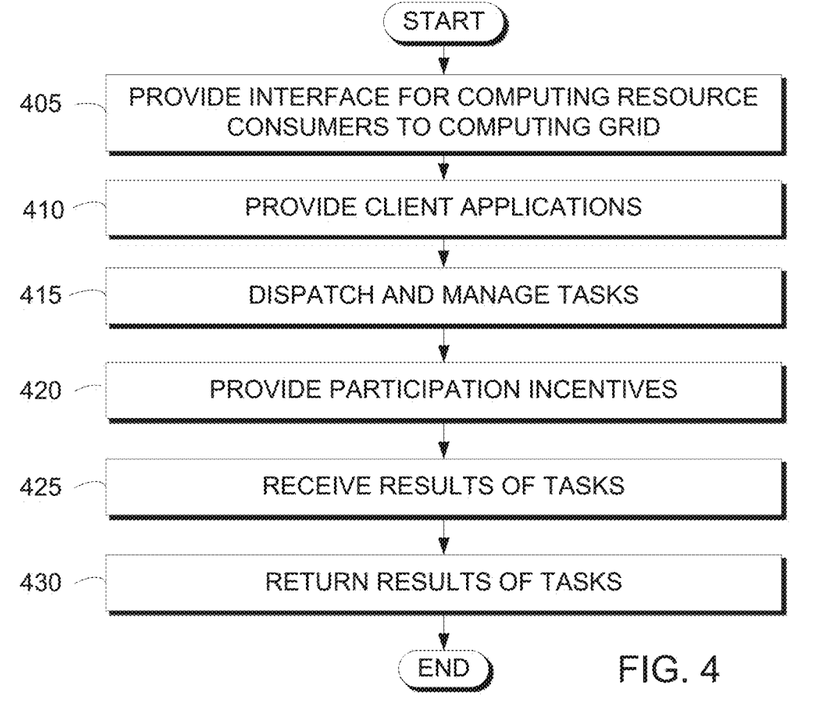
FIG. 4 illustrates a flowchart of a process for providing a platform for collaborative processing of computing tasks in accordance with various embodiments of the present disclosure.

FIG. 4 illustrates a process for providing a platform for collaborative processing of computing tasks in accordance with various embodiments of the present disclosure. For example, the process depicted in FIG. 4 is described as implemented by the server 200 in FIG. 2. The process may also be implemented by any of the servers 102-104 in FIG. 1.

The process begins with the server 200 providing an interface for computing resource consumers to a computing grid (step 405). For example, in step 405, the server 200 may connect with computer systems for computing resource consumers, such as, for example, data processors, databases, networks, programmers, researchers, and/or developers over a network to receive projects or task that need computing resources. Numerous computing, research, or development projects can significantly benefit from an increased amount of computing resources to provide faster solutions or further validation and improvement to solutions. As part of this step, the server 200 or perhaps a server associated with a game developer (e.g., server 103) may provide via the interface one or more games to provide solutions to the problems. For example, the gamification of certain tasks can drive user engagement, which increases the amount of computing resources available. In some embodiments, this video game (or suite of games) is agnostic to the type of tasks or research to be conducted. In various embodiments, the video games are developed to leverage the human brain's ability to perform three-dimensional pattern matching and spatial reasoning to help solve problems quicker than with ordinary brute force machine learning algorithms.

The server 200 then provides one or more client applications (step 410). For example, in step 410, the server 200 may provide software to client devices (e.g., such as client devices 106-114) for the client devices to be participants in the volunteer computing grid. The client applications provide at least the abilities for the client devices to request and receive projects or computing tasks as well as report results of the projects. For example, the client applications may include program code associated with a machine learning application to request computational tasks or process at least part of a machine learning algorithm or program code associated with an interactive application for tasks utilizing inputs from a user.

In providing the one or more client applications to one or more or a plurality of client devices, the program code in the one or more client applications provided to different client devices may be different. For example, program code for requesting user input via an interactive application may be sent to some client devices (e.g., based on the type of device such as gaming devices or personal electronic devices that are more likely or statistically determined to be interacted with more by users) while program code for processing the machine learning application may be sent to other devices (e.g., devices with better computing resource availability such as devices determined to have more processing or storage capability or devices likely or statistically determined be on or idle more often such as electronic devices performing traditional servers As discussed in greater detail with regard to step 420, the client applications may also include criteria for tacking, evaluating, and incentivizing participation by the client devices. As part of this step, the server 200 may also provide the interactive applications, such as one or more games or programs requiring user input, for users of the client devices to play or interact with to incentivize participation and/or collaborate to solve problems as discussed herein.

In some embodiments, as part of this step, the application provider may operate within an advertisement, such as an in-game, in-video, in-music, or website advertisement. For example, in addition to or in lieu of traditional advertisements, an end user can contribute or "pay" for the content they are viewing, playing, or listening to by donating or allowing the advertisement to utilize the computing resources of the client device 300. In some embodiments, these advertisements may run the background or be displayed with little or no interactivity from the user and/or interruption to the user. In other embodiments, these advertisements may be interactive and solicit human intuition based pattern matching or other citizen science feedback. For example, the advertisement may utilize user input results from interactive bot detection techniques, such as completely automated public Turing test to tell computers and humans apart (CAPTCHA), to aid in pattern matching, for example, to generate training data.

Thereafter, the server 200 dispatches and manages computing tasks (step 415). Computing tasks are tasks that utilize computing resources, such as processing, computing, storage, or network resources, of a computing device. For example, as part of this step, the computing tasks may include one or more tasks needing inputs from the user such as computational, matching, or pattern identification tasks that are, for example, presented as part of an interactive application. The computing tasks may also include tasks associated with a machine learning application such as for the processing of a machine learning algorithm. For example, the computing tasks may include iteratively processing of at least part of the machine learning algorithm based on the inputs received from the user such as, iteratively updating a machine learning application using user-assisted training data that is performed all within the same platform provided via the client applications running on the volunteer computing grid. In some embodiments, the user inputs used in the processing of the machine learning algorithm are requested and received via the interactive application, for example, during game play of a video game. Additionally, the user inputs may be received from different client devices than those processing the machine learning algorithm based on the inputs.

As part of step 415, the server 200 may receive requests from the one or more of the client devices that are members of the volunteer computing grid. The requests may simply be an indication that resources of the client device are available.

For example, the client device may be idle resulting in free processor resources. In another example, the client device may be network connected and thus available for data reads and writes as part of providing storage resources to the grid. In some embodiments, the tasks may already have been provided, for example, as part of a game, with the client application in step 410. In some embodiments, the server 200 manages the tasks by providing tasks that can be performed in parallel and redundant tasks for result validation.

In some embodiments, the server 200 may dispatch and manage the computing tasks using blockchain technology. A blockchain is a list of records or blocks that are linked and secured using encryption. For example, the records or blocks may include transactional data or programs. In these embodiments, the server 200 may add records for the various computing tasks to be completed to the blockchain. Client devices (e.g., client devices 106-114) can then receive or pull these computing tasks from the blockchain. These computing tasks include user tasks such as those requiring user input or human intuition. The server 200 (and/or, for these embodiments, other computing devices referred to as "miners" in blockchain technology) manage the computing tasks by attempting to validate results of the computing tasks. For example, the server 200 (or a group of miners) may receive results in the form of new records to be added to the blockchain and validate the record based on the criteria associated with the task. For example, the criteria associated with the task includes the actions to be performed, timing, quantity, and/or quality of the results of the task performance. The server 200 (or a group of miners) may validate the record based on the record indicating or including data for completion of the task. Additionally, the server 200 (or a group of miners) may validate the record based on timing or result quality. For example, the first to perform, those finished before a certain time, or results of a certain level of consistency with results of others performing the task may be validated. Based on a certain level of consensus for the received record, the server 200 (or a group of miners) then adds the record to the blockchain. As part of the addition, the record may convey some form of value, e.g., in the form of cryptocurrency, to the client device from which the record was received.

In various embodiments, the server 200 is a manager or master node that coordinates local processes and access among the client devices. In these examples, the client devices may be accessible via a dynamic domain name server (DNS) system that presents the various client devices to the server 200 as a single network. Also, as discussed throughout, the computing resources provided via the grid computing system are not limited to processing resources. In various embodiments, the server 200 implements via the client devices of the grid computing system a distributed file system. For example, the server 200 may shard files into a predetermined size (e.g., 16 MB, 32 MB, or 64 MB) chunks and distributes the chunks across devices, which may be replicated for redundancy, and presents the shared space as a single folder to the accessing application.

The server 200 then provides participation incentives (step 420). For example, in step 420, the server 200 can provide any type of incentive to encourage participation including, without limitation, information that their contribution is funding an important project, digital currency and media content, such as, literature, images, music, videos, virtual objects for video games, video games, etc. In one example, the server 200 may track the amount of participation and/or the quality of the tasks performed and provide proportional digital currency, media content, or virtual objects for video games. For example, participation may be tracked via metrics such as time duration, floating point operations per second (FLOPS) (or more commonly giga-FLOPS (GFLOPS)), amount of storage hours, etc. The server 200 may also grade qualitative participation, for example, based on scores achieved during gameplay that result in more advanced solutions. As part of this step, the server 200 may credit an account of a user of a client device with digital currency (e.g., bitcoin, dollars, etc.), may provide additional or better virtual objects for video games that improve a user's gameplay experience, may allow continued gameplay, or download/online play for additional video games.

In various embodiments, the server 200 uses media content to drive participation. For example, as part of using a paid streaming service, such as for music or video, the cost of the streaming service may be subsidized or covered if the user provides some amount of computing resources to the grid. Most streaming services such as music or video primarily use devices buffering and network resources. For example, while watching an online video channel or streaming music, the device will likely have unused processing and/or longer-term storage resources available for use by the volunteer computing grid. By incentivizing participation with subsidized or free streaming content, and entertaining the end user during participation with the content, embodiments of the present disclosure can increase the size and availability of the volunteer computing grid. In various embodiments, the incentives may be provided at the end user level or at the content provider level. For example, online video game providers or media content providers can be compensated for including with their content player or video game at least a portion of the client application provided in step 400 to enable the end user's device to be part of the volunteer computing grid. These game/media providers are then enabled to provide end users with lower cost content and games as a result of the end user's device participating in the volunteer computing grid.

Thereafter, server 200 receives results of tasks (step 425). For example, in step 425, the server 200 may receive results of WU from client devices as the computing tasks are completed and/or as network resources are available. As part of this step, the server 200 may perform processing and validation of the results of the computing tasks. For example, only results that achieve a certain metric or score may be filtered out for use by researchers or developers. In another example, the server 200 may compare results of a certain number of redundant tasks to validate whether results from certain client devices are reliable.

The server 200 then returns results of tasks (step 430). For example, in step 430, the server 200 may provide the results to the computing resource consumer (e.g., to server 104) using the same interface provided for the data in step 405 to solve problems or validate solutions for the researchers and/or developers. In this manner, embodiments of the present disclosure implement and provide a platform for collaborative research and development using grid computing.

Figure 5:
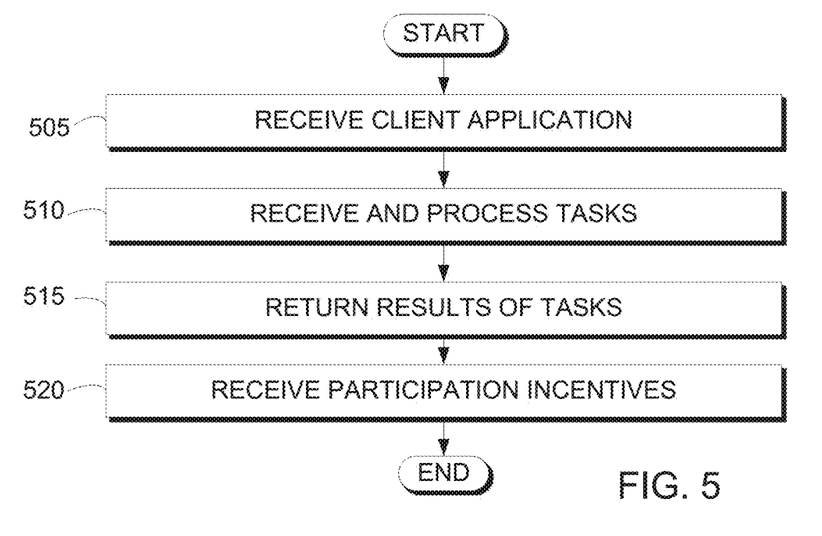
FIG. 5 illustrates a flowchart of a process for participating in a volunteer computing grid in accordance with various embodiments of the present disclosure.

FIG. 5 illustrates a process for participating in a volunteer computing grid in accordance with various embodiments of the present disclosure. For example, the process depicted in FIG. 5 is described as implemented by the client device 300 in FIG. 3. The process may also be implemented by any of the client devices 106-114 in FIG. 1.

The process begins with the client device 300 receiving one or more client applications (step 505). For example, in some embodiments, in step 505, the client device 300 may receive a dedicated application to participate in a volunteer computing grid. The client device 300 may also receive an interactive application, such as a video game, or a media streaming application that includes within a plugin or other component for volunteer computing grid participation during gameplay or media streaming. The client applications may include program code for machine learning applications for processing by the client device 300.

The client device 300 then receives and processes tasks (step 510). For example, in step 510, the client device 300 may request computing tasks when the received application is run on the client device 300. In some embodiments, the tasks are part of a larger problem being researched, for machine learning applications, and/or may include citizen science collaboration opportunities, for example, via game interaction as discussed above. The client device 300 then returns results of tasks (step 515), for example, to server 200 for validation and provision to researchers and/or developers.

In various embodiments, as part of or for step 510, the client device 300 executes program code for the interactive application to generate a user interface to request and receive inputs from a user. For example, the interactive application may be a program requesting user inputs to identify object(s) in an image or series of image or a game requesting user inputs to provide citizen science inputs. The client device 300 receives and processes the user inputs as results for the received computing task.

Additionally or alternatively, the client device 300 may process program code process program code for the machine learning application. For example, the client device 300 may provide computing resources to further the machine learning application, e.g., by iteratively processing a machine learning algorithm, storing processing results, and/or validating machine learning algorithm processing results. In another example, the client device 300 may iteratively receive and process the results of the user inputs received by the client device 300 or other client device(s) in the computing grid in connection with the machine learning application to iteratively improve the machine learning algorithm. For example, the client device 300 may utilize pattern recognition inputs or training data inputs from the interactive application to improve the machine learning application all within a single platform as part of the tasks performed by the volunteer computing grid. In some embodiments, the tasks performed by the client device 300 may be received from another client device in the computing grid. For example, the machine learning task(s) performed by the client device 300 may be received from other client device(s) providing the user input results for literately improving the machine learning algorithm and vice versa. In another example, the interactive application task(s) performed by the client device 300 may be received from other client device(s) that are processing the user input results received from the client device 300 in literately improving the machine learning algorithm and vice versa.

In various embodiments, as part of or for steps 510 and 515, the client device 300 may receive a task for computation from a blockchain (e.g., as discussed above), perform the task, and send, in or as the data for the results, a record to be posted to the blockchain as completion of the task. For example, in these embodiments, the tasks to be performed include tasks requiring the inputs from the user such as computational or pattern matching tasks and are part of the blockchain. The client device 300 may then perform the task including requesting and receiving the inputs from the user of the electronic device and generate the data required to show completion of the task. For example, this data may include generated training data or data indicative of pattern recognition. The client device 300 then sends the data or a proposed blockchain record to the server 102 (e.g., a miner) for posting to the blockchain to receive independently validated credit for completion of the task.

Thereafter, the client device 300 provides participation incentives (step 520). For example, in step 520, the client device 300 may provide incentives to the end user to encourage for volunteer computing participation. The amount and/or quality of the incentives can be based on the amount and/or quality of volunteer computing contribution provided. The incentives and amounts may be determined autonomously at the client device upon task completion or via the server 200 after task results reporting and validation. The participation incentives may be any item of value whether related to the application or not such as, for example, digital currency, cryptocurrency, media content, virtual objects for video games, video games, etc. In some embodiments, incentives may be applied at a developer level, whereby the end user is incentivized by subsidized or free media content, games, levels within games, virtual objects within games, etc. Thus, end user incentives can be provided before, during, or after actual task completion by the client device.

Although FIGS. 4 and 5 illustrate examples of processes for providing a platform for collaborative research and development using grid computing and participating in a volunteer computing grid, respectively, various changes could be made to FIGS. 4 and 5. For example, while shown as a series of steps, various steps in each figure could overlap, occur in parallel, occur in a different order, or occur multiple times. In another example, steps may be omitted or replaced by other steps.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "such as," when used among terms, means that the latter recited term(s) is(are) example(s) and not limitation(s) of the earlier recited term. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory, computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Although the present disclosure has been described with an exemplary embodiment, various changes and modifications may be suggested to one skilled in the art. It is intended that the present disclosure encompass such changes and modifications as fall within the scope of the appended claims.

One embodiment provides a method for processing computing tasks. The method includes sending, to a plurality of client devices, one or more client applications including program code associated with an interactive application and a machine learning application. The program code, when executed by a processor of one or more of the plurality of client devices, causes the one or more client devices to generate a user interface for the interactive application; request, using the generated user interface for the interactive application, inputs from a user of the one or more client devices; receive the requested inputs; process, using computing resources of the one or more client devices, at least part of the machine learning application; and transmit data associated with results of the received inputs and the processing of at least part of the machine learning application. The method further includes receiving and processing the data associated with the results of the received inputs and the processing of at least part of the machine learning application to process the computing tasks.

Another embodiment provides a system for processing computing tasks. The system includes a communication interface and a processor operably connected to the communication interface. The communication interface is configured to send, to a plurality of client devices, one or more client applications including program code associated with an interactive application and a machine learning application. The program code, when executed by a processor of one or more of the plurality of client devices, causes the one or more client devices to generate a user interface for the interactive application; request, using the generated user interface for the interactive application, inputs from a user of the one or more client devices; receive the requested inputs; process, using computing resources of the one or more client devices, at least part of the machine learning application; and transmit data associated with results of the received inputs and the processing of at least part of the machine learning application. The communication interface is further configured to receive the data associated with the results of the received inputs and the processing of at least part of the machine learning application. The processor is configured to process the data associated with the results of the received inputs and the processing of at least part of the machine learning application to process the computing tasks.

Another embodiment provides a non-transitory, computer-readable medium. The non-transitory, computer-readable medium includes program code associated with an interactive application and a machine learning application. The program code, when executed by a processor of an electronic device, causes the electronic device to generate a user interface for the interactive application; request, using the generated user interface for the interactive application, inputs from a user of the electronic device; receive the requested inputs; process, using computing resources of the electronic device, at least part of the machine learning application; and transmit data associated with results of the received inputs and the processing of at least part of the machine learning application.

In any of the above examples and embodiments, the plurality of client devices form a volunteer computing grid, and the processing of at least part of the machine learning application is performed based at least in part on the received inputs received by at least one of the client devices in the volunteer computing grid.

In any of the above examples and embodiments, providing participation incentives based on the data associated with the results received from respective ones of the one or more client devices may be included.

In any of the above examples and embodiments, allowing at least subsidized media content to be provided to one of the plurality of client devices when the one client device is running the one or more client applications may be included.

In any of the above examples and embodiments, adding a task for completion via the plurality of client devices to a blockchain, the task requiring the inputs from the user of the one or more client devices for completion may be included. Receiving and processing the data associated with the results comprises receiving, from the one or more client devices, a record to be posted to the blockchain as completion of the task; validating the received record based on criteria associated with the task; and adding the validated record to the blockchain.

In any of the above examples and embodiments, validating the received record comprises determining whether the record indicates completion of the task based on the criteria associated with the task; and validating the record in response to the record indicating completion of the task.

In any of the above examples and embodiments, the system may be or the method may be performed by one of the client devices.

In any of the above examples and embodiments, the electronic device is one of plurality of client devices forming a volunteer computing grid and the processing of at least part of the machine learning application is performed based at least in part on the received inputs received by at least one of the client devices in the volunteer computing grid.

In any of the above examples and embodiments, the electronic device receives participation incentives based on the data associated with the results.

In any of the above examples and embodiments, the electronic device receives at least subsidized media content when the electronic device is processing the program code associated with at least one of the interactive application or the machine learning application.

In any of the above examples and embodiments, the electronic device receives a task for completion from a blockchain, the task requiring the inputs from the user of the electronic device for completion; performs the task including requesting and receiving the inputs from the user of the electronic device; and sends, in the data associated with the results, a record to be posted to the blockchain as completion of the task.

None of the description in this application should be read as implying that any particular element, step, or function is an essential element that must be included in the claim scope. The scope of the patented subject matter is defined only by the claims. Moreover, none of the claims is intended to invoke 35 U.S.C. § 112(f) unless the exact words "means for" are followed by a participle.

What is claimed is:

1. A method for processing computing tasks, the method comprising:
sending, by a system to a plurality of client devices, one or more client applications including program code for an interactive application and a machine learning application, the plurality of client devices forming a volunteer computing grid, the program code, when executed by processors of the plurality of client devices, respectively, causes the plurality of client devices to:
generate a user interface for the interactive application;
request, using the generated user interface for the interactive application, inputs from respective users of the plurality of client devices;
receive the requested inputs;
process, using computing resources of the plurality of client devices, respectively, at least part of the machine learning application, including to:
iteratively process, based on the received inputs, a machine learning algorithm of the machine learning application, wherein the requested inputs include pattern recognition inputs or training data inputs; and
modify the machine learning algorithm based on the iterative processing of the received inputs; and
transmit data indicating the received inputs and including the processing of at least part of the machine learning application; and
receiving and processing, by the system, the data, from the plurality of client devices in the volunteer computing grid, indicating the received inputs and including the processing of at least part of the machine learning application to generate results for the computing tasks.

2. The method of claim 1, wherein:
the interactive application is a video game and the computing tasks are research and development computing tasks for a research and development application,
the research and development computing tasks are performed at least in part based on (i) the received inputs and (ii) the processing of at least part of the machine learning application at the plurality of client devices, and
the video game is agnostic to the research and development computing tasks.

3. The method of claim 1, wherein:
the interactive application is a video game,
the processing of at least part of the machine learning application, at the plurality of client devices, is performed based at least in part on the inputs received by respective ones of the plurality of client devices in the volunteer computing grid, and
the requested and received inputs are requested and received as part of game play of the video game to generate training data for the machine learning application, to provide at least some supervised learning of one or more solutions generated by the machine learning application, and to provide changes to the one or more solutions generated by the machine learning application.

4. The method of claim 1, further comprising allowing at least subsidized media content to be provided to one of the plurality of client devices when the one client device is running the one or more client applications.

5. The method of claim 1, further comprising:
adding a task for completion via the plurality of client devices to a blockchain, the task requiring the inputs from the respective users of the plurality of client devices for completion,
wherein receiving and processing the data comprises:
receiving, from one or more of the plurality of client devices, a record to be posted to the blockchain as completion of the task;
validating the received record based on criteria associated with the task; and
adding the validated record to the blockchain.

6. The method of claim 5, wherein validating the received record comprises:
determining whether the record indicates completion of the task based on the criteria associated with the task; and
validating the record in response to the record indicating completion of the task.

7. A system for processing computing tasks, the system comprising:
a communication interface configured to:
send, to a plurality of client devices, one or more client applications including program code for an interactive application and a machine learning application, the plurality of client devices forming a volunteer computing grid, the program code, when executed by processors of the plurality of client devices, respectively, causes the plurality of client devices to:
generate a user interface for the interactive application;
request, using the generated user interface for the interactive application, inputs from respective users of the plurality of client devices;
receive the requested inputs;
process, using computing resources of the plurality of client devices, respectively, at least part of the machine learning application, including to:
iteratively process, based on the received inputs, a machine learning algorithm of the machine learning application, wherein the requested inputs include pattern recognition inputs or training data inputs; and
modify the machine learning algorithm based on the iterative processing of the received inputs; and
transmit data indicating the received inputs and including the processing of at least part of the machine learning application; and
receive the data indicating the received inputs and including the processing of at least part of the machine learning application; and
a processor operably connected to the communication interface, the processor configured to process the data, received from the plurality of client devices in the volunteer computing grid, associated with the received inputs and the processing of at least part of the machine learning application to generate results for the computing tasks.

8. The system of claim 7, wherein:
the interactive application is a video game and the computing tasks are research and development computing tasks for a research and development application,
the research and development computing tasks are performed at least in part based on (i) the received inputs and (ii) the processing of at least part of the machine learning application at the plurality of client devices, and
the video game is agnostic to the research and development computing tasks.

9. The system of claim 7, wherein:
the interactive application is a video game,
the processing of at least part of the machine learning application, at the plurality of client devices, is performed based at least in part on the inputs received by respective ones of the plurality of client devices in the volunteer computing grid, and
the requested and received inputs are requested and received as part of game play of the video game to generate training data for the machine learning application, to provide at least some supervised learning of one or more solutions generated by the machine learning application, and to provide changes to the one or more solutions generated by the machine learning application.

10. The system of claim 7, the processor is further configured to allow at least subsidized media content to be provided to one of the plurality of client devices when the one client device is running the one or more client applications.

11. The system of claim 7, wherein:
the processor is further configured to add a task for completion via the plurality of client devices to a blockchain, the task requiring the inputs from the respective users of the plurality of client devices for completion;
the communication interface is configured to receive, from one or more of the plurality of client devices, in the data, a record to be posted to the blockchain as completion of the task; and
the processor is further configured to:
validate the received record based on criteria associated with the task; and
add the validated record to the blockchain.

12. The system of claim 11, wherein to validate the received record, the processor is further configured to:
determine whether the record indicates completion of the task based on the criteria associated with the task; and
validate the record in response to the record indicating completion of the task.

13. A non-transitory, computer-readable medium comprising first program code for processing computing tasks, the first program code, when executed by a processor of a system, causes the system to:
send, to a plurality of client devices, one or more client applications including second program code for an interactive application and a machine learning application, the plurality of client devices forming a volunteer computing grid, the second program code, when executed by processors of the plurality of client devices, respectively, causes the plurality of devices to:
generate a user interface for the interactive application;
request, using the generated user interface for the interactive application, inputs from respective users of the plurality of client devices;
receive the requested inputs;
process, using computing resources of the plurality of client devices, respectively, at least part of the machine learning application, including to:
iteratively process, based on the received inputs, a machine learning algorithm of the machine learning application, wherein the requested inputs include pattern recognition inputs or training data inputs; and
modify the machine learning algorithm based on the iterative processing of the received inputs; and
transmit data indicating the received inputs and including the processing of at least part of the machine learning application; and
receive and process the data, from the plurality of client devices in the volunteer computing grid, indicating the received inputs and including the processing of at least part of the machine learning application to generate results for the computing tasks.

14. The computer-readable medium of claim 13, wherein:
the interactive application is a video game and the computing tasks are research and development computing tasks for a research and development application,
the research and development computing tasks are performed at least in part based on (i) the received inputs and (ii) the processing of at least part of the machine learning application at the plurality of client devices, and
the video game is agnostic to the research and development computing tasks.

15. The computer-readable medium of claim 13, wherein:
the interactive application is a video game,
the processing of at least part of the machine learning application, at the plurality of client devices, is performed based at least in part on the inputs received by respective ones of the plurality of client devices in the volunteer computing grid, and
the requested and received inputs are requested and received as part of game play of the video game to generate training data for the machine learning application, to provide at least some supervised learning of one or more solutions generated by the machine learning application, and to provide changes to the one or more solutions generated by the machine learning application.

16. The computer-readable medium of claim 13, further comprising program code, that when executed by the processor of the system, causes the system to allow at least subsidized media content to be provided to one of the plurality of client devices when the one client device is running the one or more client applications.

17. The computer-readable medium of claim 13, further comprising program code, that when executed by the processor of the system, causes the system to:
add a task for completion via the plurality of client devices to a blockchain, the task requiring the inputs from the respective users of the plurality of client devices for completion;
receive, from one or more of the plurality of client devices, in the data, a record to be posted to the blockchain as completion of the task;
validate the received record based on criteria associated with the task; and
add the validated record to the blockchain.

* * * * *